(12) United States Patent
Doran

(10) Patent No.: US 12,182,131 B1
(45) Date of Patent: Dec. 31, 2024

(54) SYSTEMS AND METHODS FOR CENTRALIZED META-DATA MANAGEMENT ACROSS PLATFORMS

(71) Applicant: Allstate Northern Ireland Limited, Belfast (GB)

(72) Inventor: Martin Doran, Antrim (GB)

(73) Assignee: Allstate Northern Ireland Limited, Belfast (GB)

( * ) Notice: Subject to any disclaimer, the term of this patent is extended or adjusted under 35 U.S.C. 154(b) by 0 days.

(21) Appl. No.: 18/345,576

(22) Filed: Jun. 30, 2023

(51) Int. Cl.
*G06F 16/2452* (2019.01)
*G06F 16/2457* (2019.01)
*H04L 9/40* (2022.01)

(52) U.S. Cl.
CPC .. *G06F 16/24573* (2019.01); *G06F 16/24524* (2019.01); *H04L 63/101* (2013.01); *G06F 2221/2141* (2013.01)

(58) Field of Classification Search
CPC ......... G06F 16/24573; G06F 16/24524; G06F 2221/2141; H04L 63/101
See application file for complete search history.

(56) References Cited

U.S. PATENT DOCUMENTS

| | | | |
|---|---|---|---|
| 6,738,772 B2 | 5/2004 | Regelski et al. | |
| 7,039,948 B2 * | 5/2006 | Harrah | G06F 21/604 707/999.009 |
| 7,383,568 B1 * | 6/2008 | Newstadt | H04L 63/0263 726/1 |
| 7,606,917 B1 * | 10/2009 | Blagoev | G06F 9/468 709/229 |
| 7,797,397 B2 | 9/2010 | Kogut-O'Connell et al. | |
| 8,327,457 B1 * | 12/2012 | Ferrara | G06F 21/604 455/26.1 |
| 9,009,777 B2 * | 4/2015 | Desai | G06F 21/30 726/16 |
| 10,122,708 B2 * | 11/2018 | Smith | H04L 63/0853 |
| 10,171,471 B2 * | 1/2019 | Biller | H04L 63/104 |
| 10,268,767 B2 * | 4/2019 | Byrne | G06F 16/9538 |
| 11,514,186 B2 * | 11/2022 | Gandhi | G06F 3/0482 |
| 11,575,677 B2 * | 2/2023 | Jani | H04L 63/102 |
| 2007/0124269 A1 * | 5/2007 | Rutter | G06Q 10/06 |

(Continued)

FOREIGN PATENT DOCUMENTS

| | | |
|---|---|---|
| CN | 101997823 B | 10/2013 |
| CN | 109547500 A | 3/2019 |

(Continued)

*Primary Examiner* — Jorge A Casanova
(74) *Attorney, Agent, or Firm* — Dinsmore & Shohl LLP

(57) ABSTRACT

Systems and methods for centralized meta-data management across platforms may include storing meta-data associated with one or more entitlements or roles of software platforms in a centralized hub, wherein each user is assigned a user account assigned to at least one or more entitlements or roles, identifying at least one user as a manager of the at least one or more entitlements or roles of a first user assigned as an owner of the at least one or more entitlements or roles, receiving a request from the manager to transfer at least a selected portion of the at least one or more entitlements or roles of the first user to one or more other users of the plurality of users, transferring the selected portion, and assigning the one or more other users as the one or more owners of the selected portion.

19 Claims, 7 Drawing Sheets

(56) References Cited

U.S. PATENT DOCUMENTS

| | | | |
|---|---|---|---|
| 2007/0174083 A1* | 7/2007 | Silverman | G06Q 50/16 705/1.1 |
| 2008/0120302 A1* | 5/2008 | Thompson | G06F 21/6209 707/999.009 |
| 2009/0063540 A1* | 3/2009 | Mattox | G06F 16/40 707/999.102 |
| 2009/0077657 A1* | 3/2009 | Williams | G06T 5/20 726/21 |
| 2010/0235396 A1* | 9/2010 | Chaurasia | G06F 21/6218 707/E17.032 |
| 2013/0060616 A1* | 3/2013 | Block | G06Q 30/0601 726/28 |
| 2014/0157350 A1* | 6/2014 | Wang | G06F 21/6218 726/1 |
| 2014/0164316 A1* | 6/2014 | Liebman | G06F 16/176 707/608 |
| 2014/0282024 A1* | 9/2014 | Ebner | G06Q 10/103 715/736 |
| 2016/0094561 A1* | 3/2016 | Jagtap | G06F 21/6218 726/28 |
| 2016/0182660 A1* | 6/2016 | Byrne | G06F 16/9538 709/217 |
| 2016/0379001 A1* | 12/2016 | Eska | G06Q 30/016 726/4 |
| 2018/0189734 A1* | 7/2018 | Newhouse | G06F 16/25 |
| 2020/0092364 A1* | 3/2020 | Schultz | H04L 9/0637 |
| 2020/0143068 A1* | 5/2020 | Chen | G06F 21/629 |
| 2020/0364355 A1* | 11/2020 | Chen | G06Q 10/10 |
| 2020/0364364 A1* | 11/2020 | Chen | G06F 21/6227 |
| 2021/0021600 A1* | 1/2021 | Ojha | H04L 63/102 |
| 2021/0409417 A1* | 12/2021 | Li | H04L 67/1001 |
| 2022/0138342 A1* | 5/2022 | Avanes | G06F 21/6218 726/26 |
| 2022/0164468 A1* | 5/2022 | Gupta | G06F 21/604 |
| 2022/0179986 A1* | 6/2022 | Veeramachaneni | G06F 3/0637 |
| 2022/0200995 A1* | 6/2022 | Morin | H04L 63/101 |
| 2022/0256438 A1* | 8/2022 | Raffa | H04L 63/105 |
| 2022/0303313 A1* | 9/2022 | Gargaro | H04L 63/205 |
| 2023/0237170 A1* | 7/2023 | Thummala | G06F 21/6218 726/26 |

FOREIGN PATENT DOCUMENTS

| | | |
|---|---|---|
| EP | 2124119 B1 | 9/2010 |
| WO | 2006026636 A2 | 3/2006 |

* cited by examiner

FIG. 2

| | Display Name | In Role? | Description | Priv-Access | Authority As | Classification | Certify | View Data | View History | Action Help | Select |
|---|---|---|---|---|---|---|---|---|---|---|---|
| Role #1 | | Yes | | None | Owner | | Edit | View Data | View History | | ☐ |
| Role #2 | | Yes | test descripti... | None | Owner | Public | Edit | View Data | View History | | ☐ |
| Role #3 | | No | | None | Owner | None | Edit | View Data | View History | | ☐ |
| Role #4 | | No | | None | Owner | None | Edit | View Data | View History | | ☐ |
| Role #5 | | No | | None | Not Confirmed | None | Confirm | View Data | View History | | ☐ |
| Role #6 | | Yes | description up ... | None | Owner | Public | Edit | View Data | View History | | ☐ |
| Role #7 | | No | | None | Owner | None | Edit | View Data | View History | | ☐ |
| Role #8 | | Yes | Choose this fo ... | None | Owner | Public | Edit | View Data | View History | | ☐ |
| Role #9 | | Yes | Chris Dillon C... | Privileged | Delegate | Restricted | Edit | View Data | View History | | n/a |
| Role #10 | | Yes | Requestable ro... | None | Owner | | Edit | View Data | View History | | ☐ |
| Role #11 | | Yes | Requestable ro... | None | Owner | | Edit | View Data | View History | | ☐ |
| Role #12 | | Yes | Birthright rol ... | None | Owner | | Edit | View Data | View History | | ☐ |
| Role #13 | | Yes | Requestable ro... | None | Owner | | Edit | View Data | View History | | ☐ |
| Role #14 | | No | Oracle OUD TES... | None | Owner | Internal | Edit | View Data | View History | | ☐ |
| Role #15 | | Yes | No description ... | None | Owner | Internal | Edit | View Data | View History | | ☐ |
| Role #16 | | Yes | PRODUCTION REA... | None | Owner | Public | Edit | View Data | View History | | ☐ |
| Role #17 | | Yes | Test descripti... | None | Owner | Restricted | Edit | View Data | View History | | ☐ |
| Role #18 | | Yes | This is a Busi... | None | Owner | Internal | Edit | View Data | View History | | ☐ |
| Role #19 | | Yes | test | None | Owner | Internal | Edit | View Data | View History | | ☐ |
| Role #20 | | Yes | This Business... | None | Owner | | Edit | View Data | View History | | ☐ |

SYSTEMS AND METHODS FOR CENTRALIZED META-DATA MANAGEMENT ACROSS PLATFORMS

TECHNICAL FIELD

The present disclosure relates to centralized meta-data management across platforms and, in particular, systems and methods to manage meta-data of entitlements and roles assigned to a user across software platforms including transfer to one or more other users.

BACKGROUND

In an enterprise, a user may be assigned to entitlements and roles across various software platforms and be required to access the different platforms to manage associated meta-data of the assigned entitlements of roles. Further, a user's position within the enterprise may change, requiring a change in the assignments. A need exists for streamlined and efficient user meta-data management across platforms in the enterprise.

BRIEF SUMMARY

According to the subject matter of the present disclosure, a system for centralized meta-data management across platforms may include one or more processors, one or more memory components communicatively coupled to the one or more processors, and machine readable instructions stored in the one or more memory components. The machine readable instructions may cause the system to perform at least the following when executed by the one or more processors: store meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles; identify within the centralized hub at least one user as a manager of the at least one or more entitlements or roles of a first user of the plurality of users, the first user assigned as an owner of the at least one or more entitlements or roles, wherein the owner of the at least one or more entitlements or roles is assigned one or more rights to update meta-data associated with the at least one or more entitlements or roles; receive a request from the manager to transfer at least a selected portion of the at least one or more entitlements or roles of the first user assigned as the owner to one or more other users of the plurality of users; transfer the selected portion of the at least one or more entitlements or roles of the first user to the one or more other users; and assign the one or more other users as the one or more owners of the selected portion of the at least one or more entitlements or roles.

According to another embodiment of the present disclosure, a system for centralized meta-data management across platforms may include a graphical user interface, one or more processors, one or more memory components communicatively coupled to the one or more processors, and machine readable instructions stored in the one or more memory components. The machine readable instructions may cause the system to perform at least the following when executed by the one or more processors: store meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles; identify within the centralized hub at least one user as a manager of the at least one or more entitlements or roles of a first user of the plurality of users, the first user assigned as an owner of the at least one or more entitlements or roles, wherein the owner of the at least one or more entitlements or roles is assigned one or more rights to update meta-data associated with the at least one or more entitlements or roles; display on the graphical user interface a subset of meta-data associated with the at least one or more entitlements or roles assigned to the first user of the plurality of users; receive a request from the manager to transfer at least a selected portion of the at least one or more entitlements or roles of the first user assigned as the owner to one or more other users of the plurality of users; transfer the selected portion of the at least one or more entitlements or roles of the first user to the one or more other users; and assign the one or more other users as the one or more owners of the selected portion of the at least one or more entitlements or roles.

According to yet another embodiment of the present disclosure, a method of centralized meta-data management across platforms may include storing meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles; identify within the centralized hub at least one user as a manager of the at least one or more entitlements or roles of a first user of the plurality of users, the first user assigned as an owner of the at least one or more entitlements or roles, wherein the owner of the at least one or more entitlements or roles is assigned one or more rights to update meta-data associated with the at least one or more entitlements or roles; display on the graphical user interface a subset of meta-data associated with the at least one or more entitlements or roles assigned to the first user of the plurality of users; receive a request from the manager to transfer at least a selected portion of the at least one or more entitlements or roles of the first user assigned as the owner to one or more other users of the plurality of users; transfer the selected portion of the at least one or more entitlements or roles of the first user to the one or more other users; assign the one or more other users as the one or more owners of the selected portion of the at least one or more entitlements or roles.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 2 illustrates the tool of FIG. 1, including a display screen showing entitlements and roles of the user account associated with a platform, according to one or more embodiments shown and described herein;

FIG. 3 illustrates the tool of FIG. 1, including a display screen showing delegates and approvers for the entitlements and roles of FIG. 2, according to one or more embodiments shown and described herein;

FIG. 4 illustrates the tool of FIG. 1, including a display screen showing application associations for the entitlements and roles of FIG. 2, according to one or more embodiments shown and described herein;

FIG. 5 illustrates the tool of FIG. 1, including a display screen showing an owner bulk transfer request for the entitlements and roles of FIG. 2, according to one or more embodiments shown and described herein;

DETAILED DESCRIPTION

In embodiments herein, a centralized hub is described for centralized meta-data management across various platforms. The platforms may be software platforms, such as Software as a service (SAAS) or other software solution platforms. Different entitlements and roles may be assigned to different user of the different platforms. Different employees in an enterprise, such as a business, may be designated as owners of the entitlements and roles. Rather than managing entitlements and roles at the different platforms, the centralized hub provides a centralized solution to manage the entitlements roles as a central location across the different platforms to provide a streamlined and centralized solution to handle meta-data integrity. Thus, in a centralized location, meta-data of entitlements and roles across different platforms assigned to a user may be updated and managed to maintain meta-data standards as necessary. The centralized hub to span across different platforms further may reduce a security footprint for an enterprise requiring management from a single secure platform rather than logging in by a user across the different platforms. The centralized hub may further thus reduce time for meta-data updates and management, provide accurate meta-data such as descriptions, classifications, and application data associated with the entitlements and roles as will be described in greater detail below, and/or maintain approver/delegates for user access to the entitlements and roles across platforms. For example, the centralized hub may be configured to remove terminated users from a platform and/or make changes regarding entitlement and role assignments for users changing positions internally, such as those transferring to a different department. In embodiments, the centralized hub may be configured to allow for a search functionality such that owners and/or non-owners may search the centralized hub to generate reports with respect to the assigned entitlements and roles across platforms regarding owners, approvers, delegates, user membership, groups, or combinations thereof. The centralized hub may allow for searching of users and access privileges by owners and/or non-owners on a platform basis or via specific group or role, and associated reports resulting from the searches may be generated and transmitted. Specific entitlements and roles searched for disabled members may be identified via such searching such that the assigned entitlements and roles for the disabled members may be transferred to a new owner for meta-data maintenance and compliance with meta-data standards of an enterprise as described herein.

Figure 1:
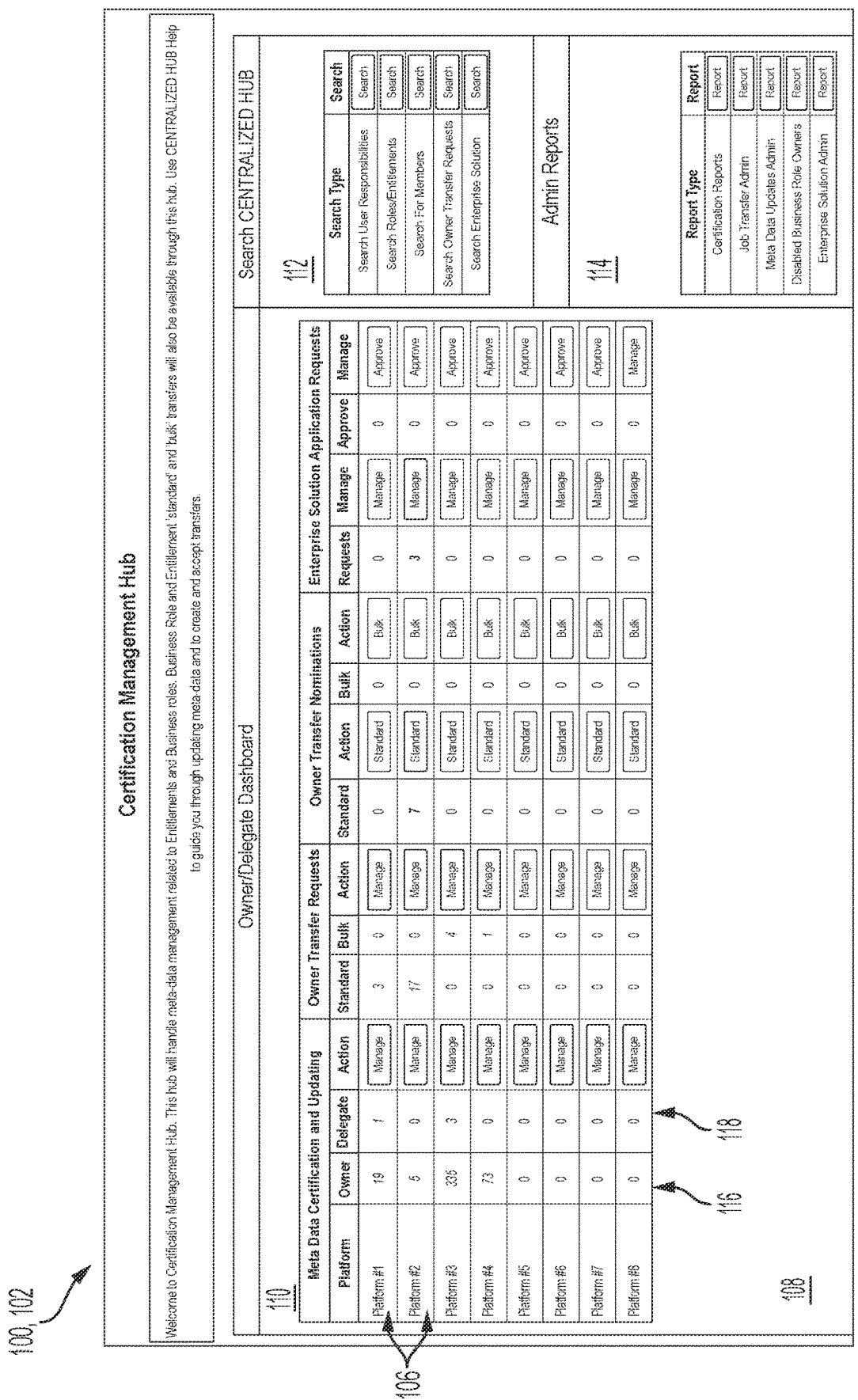
FIG. 1 illustrates a tool for centralized meta-data management across platforms and display of meta-data associated with entitlements and roles assigned to a user account, according to one or more embodiments shown and described herein.

Referring to FIG. 1, a tool 100 for the centralized hub including centralized meta-data management across platforms 106 and display screen 102 on a graphical user interface (GUI) 108 of meta-data and related information 110 associated with entitlements and roles assigned to a user account is shown. In embodiments, a user account may be assigned to a user as an individual or a group. A search box 112 associated with searching through the centralized hub is included, as well as a report box 114 for generating reports via the centralized hub. In embodiments, the report box 114 allows for specialized access of a user to create certifications and/or generate administrative reporting, such as regarding such certifications. A number of owners 116 and delegates 118 associated with the listed platforms 106 is also shown. The tool 100 of FIG. 1 shows a certification management hub representative of a profile relating to a user (i.e., an individual user or group) as an owner 116 or delegate 118 of different platforms 106. As an owner 116 or delegate 118, the user may access meta-data within their assigned entitlements and roles across the different platforms 106 within their enterprise. Users can additionally track any transactions within the centralized hub such as owner transfer requests or enterprise solution application requests.

A system 700, described in greater detail below with respect to FIG. 7, may include the GUI 108 as part of the tool 100. Machine readable instructions that cause the system 700 to perform a logic scheme when executed by the one or more processors 704. As a non-limiting example, a subset of meta-data associated with the at least one or more entitlements or roles 204 assigned to a user account of a user of the a plurality of users may be displayed on the GUI 108. Further, designation of the user account of the user as owner 116, delegate 118, or combinations thereof of the subset of meta-data associated with the at least one or more entitlements or roles 204 may be displayed on the GUI 108.

In embodiments, via the GUI 108 and the search box 112, access rights designations may be searched across the one or more entitlements 204A and one or more roles 204B of at least two software platforms 106 in the centralized hub. The access rights designations may include owner 116, approver, delegate 118, group membership, assigned roles 204B, assigned entitlements 204A, applications 402 (FIG. 4) associated with an enterprise solution, or combinations thereof. Additionally or alternatively, via the GUI 108 and the search box 112, owner transfer requests may be searched with respect to the one or more entitlements 204A and one or more roles 204B of at least two software platforms 106 in the centralized hub.

Via the GUI 108, the owner 116 may add or remove approver status for other users, delegates status for other users, or combinations thereof associated with the at least one or more entitlements or roles 204. On the GUI 108, a subset of meta-data associated with the at least one or more entitlements or roles assigned to the first user of the plurality of users may be displayed.

Referring to FIG. 2, a display screen 200 showing a meta-data certification tab 202 listing entitlements and roles 204 of the user account associated with a platform 106 of the platforms 106 listed in FIG. 1 is shown. Related meta-data is also listed. Meta-data for each group or role not meeting a meta-data standard may be highlighted and/or include an empty field to indicate to the owner 116 that an action regarding the meta-data to improve and/or maintain integrity is required. When an owner 116 is terminated within an enterprise, an assigned manager of the owner 116 may be made a temporary owner 116 of the group, entitlement, or role to manage and re-assign the group, entitlement, or role as described herein. Related meta-data may include descriptions 206 and classifications 208 associated with the entitlements and roles 204. Also displayed are status icons 210 indicative of action required for meta-data certification and/or updates regarding the meta-data associated with entitlements and roles 204. One or more icons 210 displayed on the GUI 108 may be representative of a state of a group, entitlement, or role of the at least one or more entitlements or roles 204. The state may be indicative of whether action is required to conform to a meta-data standard associated with the group, entitlement, or role. Such icons 210 may thus aid an owner 116 or delegate 118 to made decisions regarding meta-data certifications to maintain or improve meta-data integrity to meet the associated meta-data standard.

Figure 3:
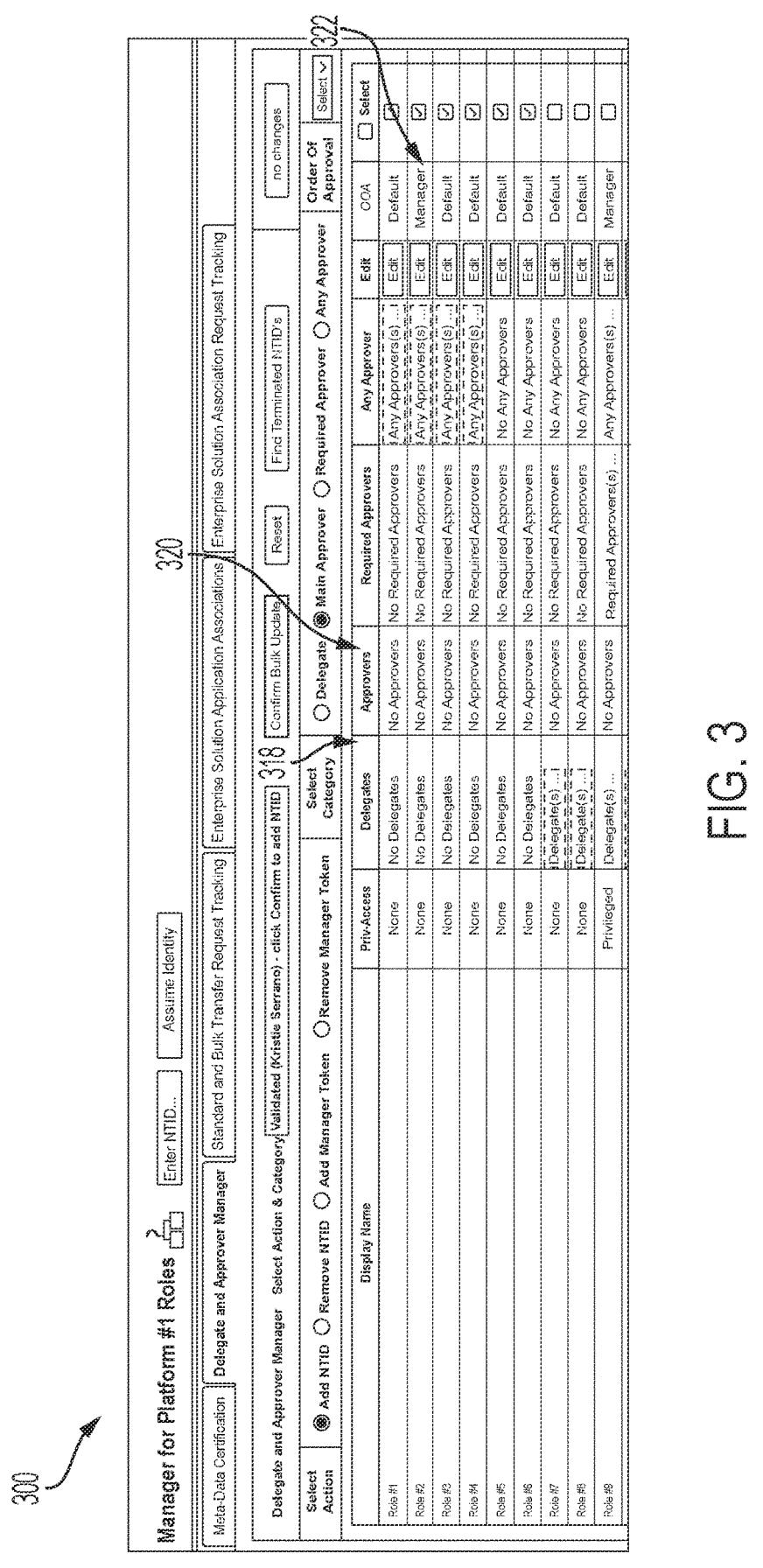

Referring to FIG. 3, a display screen 300 showing statuses of delegates 318 and approvers 320 and managers 322 for the entitlements and roles 204 of the platform 106 of FIG. 2 is shown. Such approvers 320 and managers 322 provide access permissions for users of the entitlements and roles 204 of the different platforms 106. Highlighted entries (i.e., shown in dashed lines around "Any Approver(s)" may be an automated detection indicative of terminated users for whom reassignment of associated entitlements and roles 204 is required. The assigned associated entitlements and roles 204 may be individually removed from associated with the terminated user and transferred or bulk removed and transferred (i.e., to individuals or groups such as service groups including assigned users). An owner 116 can add or remove approvers or delegates 116 (which may be individuals or groups such as services groups including assigned users) using a bulk transfer as described herein. The centralized hub may be configured to conduct validation and duplicate checks for verification prior to allowing the bulk transfer to occur upon receiving a bulk transfer require. The centralized hub may further be configured to edit individual groups, entitlements, or roles, such as via the "edit" buttons. Each approver pool may add different levels of approval, and an owner 116 may include a manager as part of the approval process for assigning user access permissions.

Figure 4:
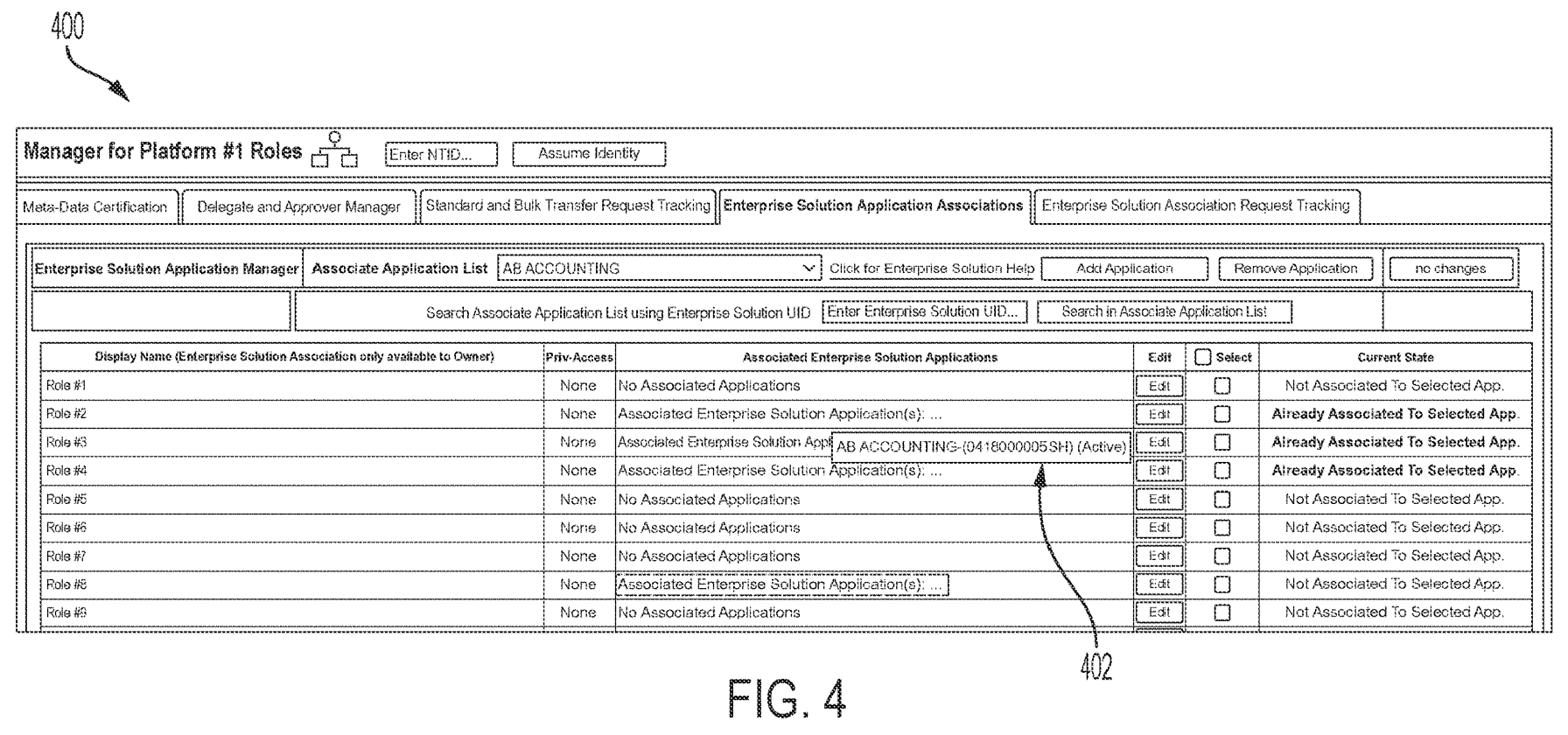

Referring to FIG. 4, a display screen 400 showing application 402 associations for the entitlements and roles 204 of the platform 106 of FIG. 2 is shown. An enterprise solution may be utilized to create meta-data for each application 402. Entitlements or roles 204 may be associated with one or more applications 402 of the enterprise solution. The centralized hub may be configured to allow an owner 116 to make such associations. Hovering above a listed associated enterprise solution application, such as for Role #3, may show what application 402 is associated with the respective entitlement or role 204. An identification number of the application 402 and/or status as active or inactive may be shown. An owner 116 may make additional application 402 associations or remove current associations. In embodiments, the system 700 may be configured to detect whether a software (e.g., application 402) for an enterprise solution associated with a related group, entitlement, or role of the at least one or more entitlements or roles has an inactive status. Upon detection of the inactive status, the owner 116 may be prompted to establish whether the related group, entitlement, or role are required. Upon a determination that the related group, entitlement, or role are not required, the software for the enterprise solution associated with the related group, entitlement, or role may be marked for deletion.

Figure 5:
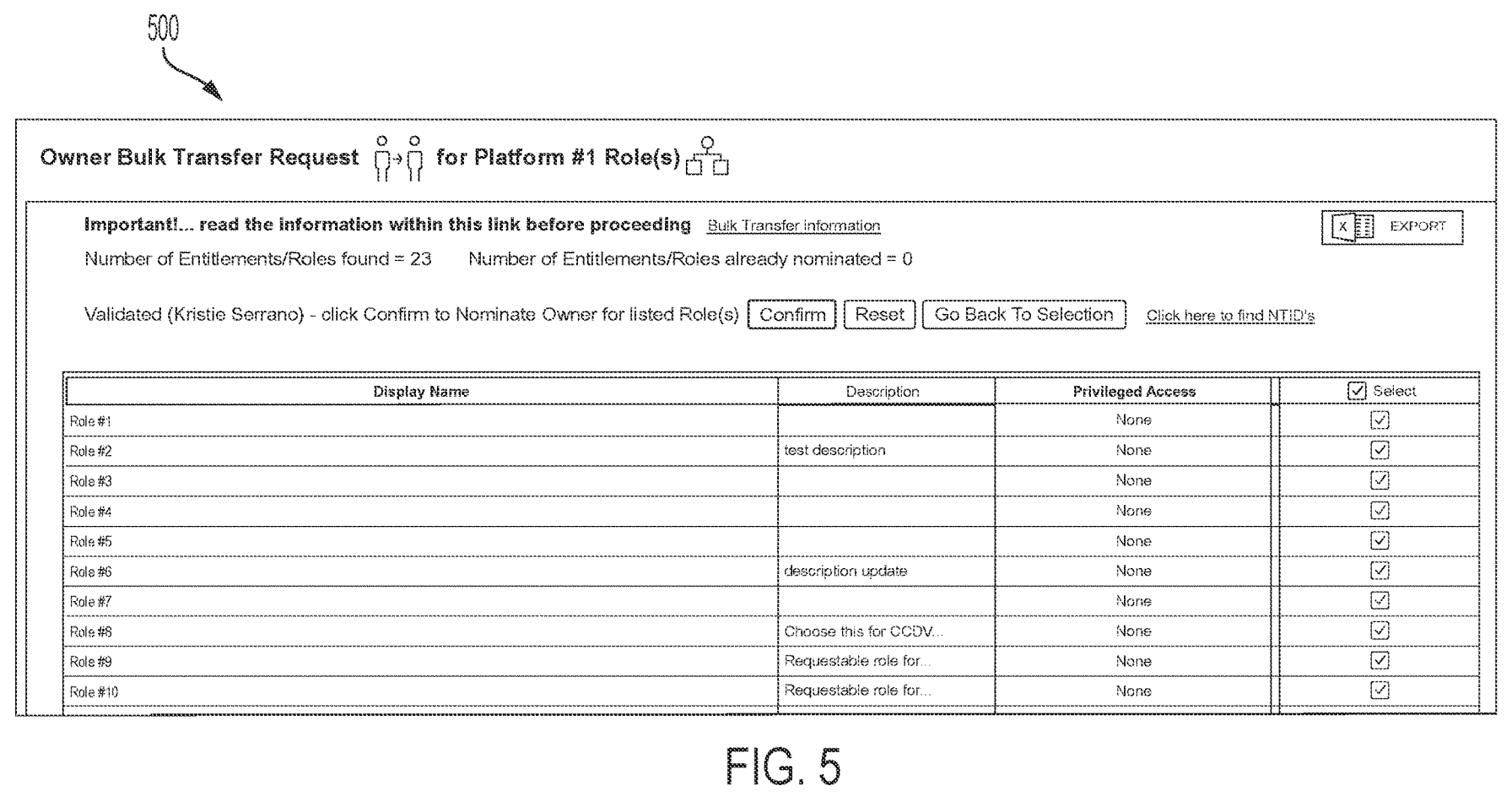

Referring to FIG. 5, a display screen 500 showing an owner bulk transfer request for the entitlements and roles 204 of the platform 106 of FIG. 2 is shown. As shown in FIG. 5, the request may be validated prior to transfer of a selection portion of the at least one or more entitlements or roles 204 of the first user assigned as the owner 117 to one or more other users of the plurality of users. In an enterprise, an employee (e.g., user) may be terminated, retire, or be transferred to another department. Ownership of the employee with respect to entitlements and roles 204 may thus need to be transferred due to such a job change status of the employee. Bulk transfer by the centralized hub allows a temporary owner 116 (e.g., manager of the employee) to move large amounts of entitlements and roles 204 to another user to assign the other user as the new owner 116. The new owner may be nominated via the centralized hub, and all selected entitlements or roles 204 may be included as part of the transfer. The new owner 116 may be validated and, after accepting the transfer of entitlements and roles 204, may be responsible for maintaining the associated meta-data.

Figure 6:
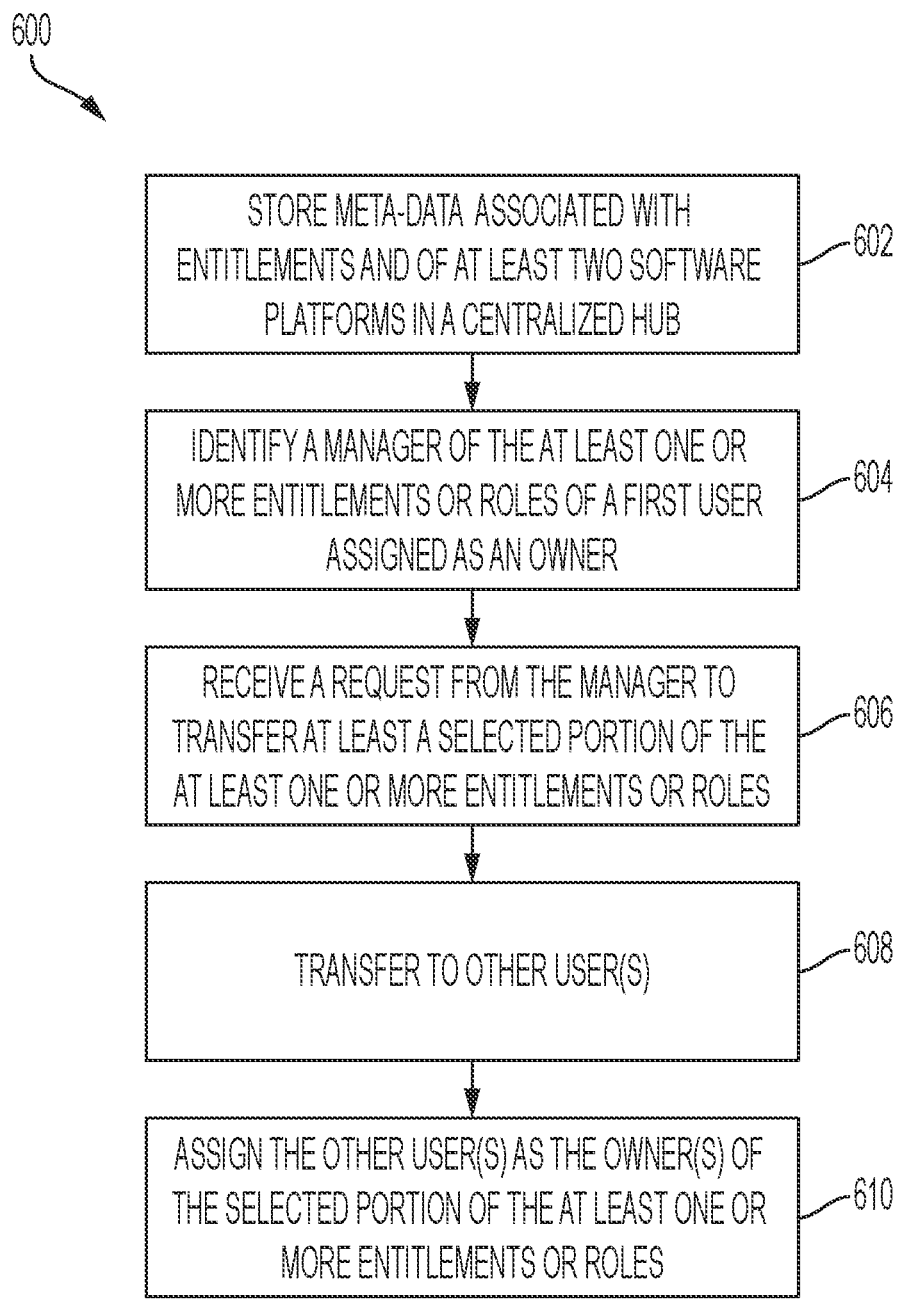
FIG. 6 illustrates a flowchart process for the tool of FIG. 1, according to one or more embodiments shown and described herein.

Referring to FIG. 6, an embodiment of a process 600 is shown for use of the tool 100 of FIGS. 1-5 (as implemented by a system 700 of FIG. 7, described in greater detail below). In block 602, meta-data associated with one or more entitlements 204A and one or more roles 204B of at least two software platforms 106 is stored in the centralized hub. Each role 204B comprises at least one of the one or more entitlements 204A. Each user of a plurality of users of the centralized hub is assigned a user account, and the user account is assigned to at least one or more entitlements or roles 204 of the one or more entitlements 204A and the one or more roles 204B.

In block 604, within the centralized hub, at least one user is identified as a manager 322 of the at least one or more entitlements or roles 204 of a first user of the plurality of users, the first user assigned as an owner of the at least one or more entitlements or roles 204.

In block 606, a request from the manager is received to transfer at least a selected portion of the at least one or more entitlements or roles 204 of the first user assigned as the owner 116 to one or more other users of the plurality of users. In embodiments, the request from the manager 322 to transfer at least the selected portion of the at least one or more entitlements or roles 204 of the first user is received based on a determination that the user account of the first user is deactivated from a group or an enterprise associated with the centralized hub. Upon the determination that the user account of the first user is deactivated, the manager 322 may be assigned as an owner 116 of the at least one or more entitlements or roles 204 of the first user.

In block 608, the selected portion of the at least one or more entitlements or roles 204 of the first user is transferred to the one or more other users. In block 610, the one or more other users are assigned as the one or more owners 116 of the selected portion of the at least one or more entitlements or roles 204.

In embodiments, the selected portion of the at least one or more entitlements or roles 204 of the first user may include all of the at least one or more entitlements or roles 204 of the first user. All of the at least one or more entitlements or roles 204 of the first user may be transferred to a primary user of the one or more other users. The primary user may be assigned as the owner 116 of all of the at least one or more entitlements or roles 204 that are transferred.

In additional or alternative embodiments, the owner 116 of the at least one or more entitlements or roles 204 may be assigned one or more rights to update meta-data associated with the at least one or more entitlements or roles 204. Meta-data as described herein may include software administrative meta-data for a respective platform 106 of the at least two software platforms 106. The software administrative meta-data may include (i) descriptions 206 of each entitlement, group, role, or combinations thereof, (ii) access rights, (iii) classifications 208, or (iv) software data of applications 402 associated with an enterprise solution, or combinations thereof. The access rights may include assignment as owner 116, approver to provide access permissions for users, delegate 118, 318, or combinations thereof for each user account associated with the respective platform 106.

Figure 7:
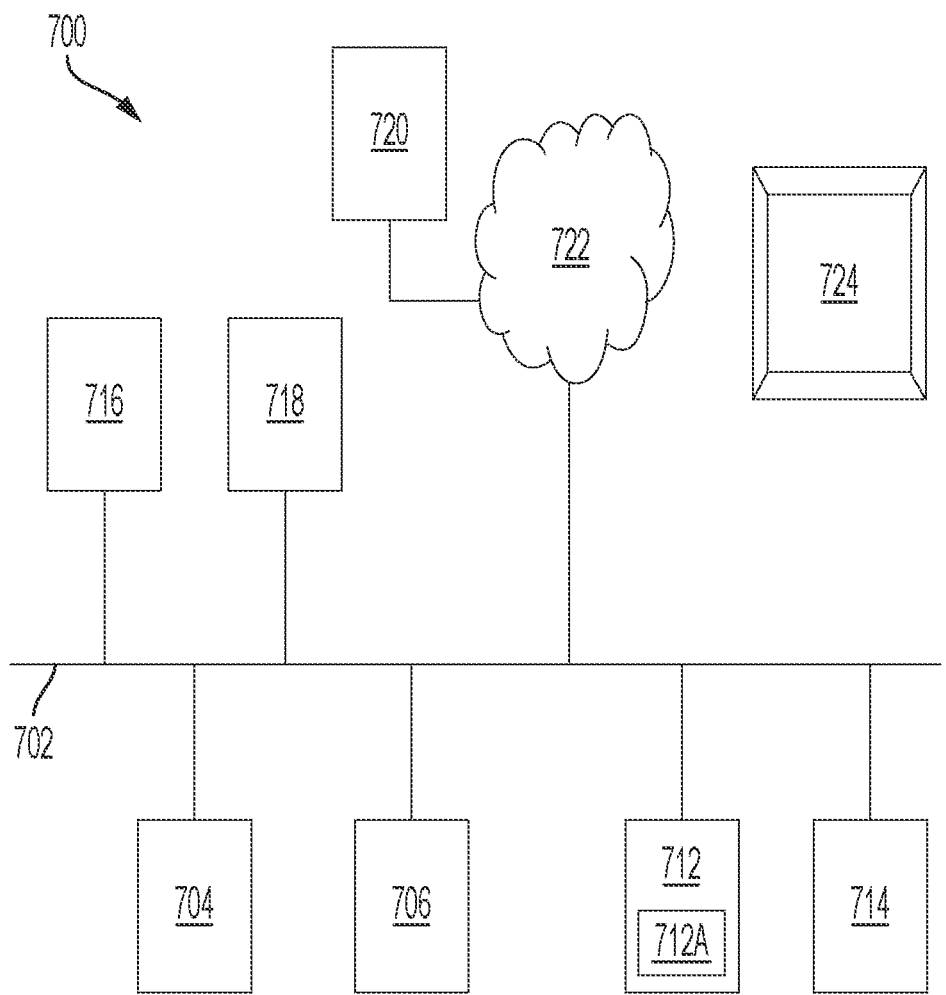
FIG. 7 illustrates a computer implemented system including a system for use with the process flow of FIG. 6 and the tool of FIG. 1, according to one or more embodiments shown and described herein.

FIG. 7 illustrates a system 700 for use with the process 600 of FIG. 6. Referring to FIG. 7, a non-transitory system 700 for implementing a computer and software-based method, such as directed by the tool 100 and the process 600, for centralized meta-data management across platforms as described herein. The system 700 comprises a communication path 702, one or more processors 704, a non-transitory memory component 706, a centralized hub 712, an assignment sub-module 712A of the centralized hub 712, a storage or database 714, an artificial intelligence module 716, a network interface hardware 718, a network 722, a server 720, and a computing device 724. The various components of the system 700 and the interaction thereof will be described in detail below.

While only one server 720 and one computing device 724 are illustrated, the system 700 can comprise multiple servers containing one or more applications and computing devices. In some embodiments, the system 700 is implemented using a wide area network (WAN) or network 722, such as an intranet or the internet. The computing device 724 may include digital systems and other devices permitting connection to and navigation of the network. It is contemplated and within the scope of this disclosure that the computing device 724 may be a personal computer, a laptop device, a smart mobile device such as a smart phone or smart pad, or the like. Other system 700 variations allowing for communication between various geographically diverse components are possible. The lines depicted in FIG. 7 indicate communication rather than physical connections between the various components.

The system 700 comprises the communication path 702. The communication path 702 may be formed from any medium that is capable of transmitting a signal such as, for example, conductive wires, conductive traces, optical waveguides, or the like, or from a combination of mediums capable of transmitting signals. The communication path 702 communicatively couples the various components of the system 700. As used herein, the term "communicatively coupled" means that coupled components are capable of exchanging data signals with one another such as, for example, electrical signals via conductive medium, electromagnetic signals via air, optical signals via optical waveguides, and the like.

The system 700 of FIG. 7 also comprises the processor 704. The processor 704 can be any device capable of executing machine readable instructions. Accordingly, the processor 704 may be a controller, an integrated circuit, a microchip, a computer, or any other computing device. The processor 704 is communicatively coupled to the other components of the system 700 by the communication path 702. Accordingly, the communication path 702 may communicatively couple any number of processors with one another, and allow the modules coupled to the communication path 702 to operate in a distributed computing environment. Specifically, each of the modules can operate as a node that may send and/or receive data.

The illustrated system 700 further comprises the memory component 706 which is coupled to the communication path 702 and communicatively coupled to the processor 704. The memory component 706 may be a non-transitory computer readable medium or non-transitory computer readable memory and may be configured as a nonvolatile computer readable medium. The memory component 706 may comprise RAM, ROM, flash memories, hard drives, or any device capable of storing machine readable instructions such that the machine readable instructions can be accessed and executed by the processor 704. The machine readable instructions may comprise logic or algorithm(s) written in any programming language such as, for example, machine language that may be directly executed by the processor 704, or assembly language, object-oriented programming (OOP), scripting languages, microcode, etc., that may be compiled or assembled into machine readable instructions and stored on the memory component 706. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 7, as noted above, the system 700 comprises the display such as the GUI on a screen of the computing device 724 for providing visual output such as, for example, information, graphical reports, messages, or a combination thereof. The display on the screen of the computing device 724 is coupled to the communication path 702 and communicatively coupled to the processor 704. Accordingly, the communication path 702 communicatively couples the display to other modules of the system 700. The display can comprise any medium capable of transmitting an optical output such as, for example, a cathode ray tube, light emitting diodes, a liquid crystal display, a plasma display, or the like. Additionally, it is noted that the display or the computing device 724 can comprise at least one of the processor 704 and the memory component 706. While the system 700 is illustrated as a single, integrated system in FIG. 7, in other embodiments, the systems can be independent systems.

The system 700 comprises the centralized hub 712 as described herein and above for centralized meta-data management across platforms, the assignment sub-module 712A to transfer owner assignments within the centralized hub 712 as described herein, and the artificial intelligence module 716 for generating reporting and/or automating assignments that may be machine learned. The artificial intelligence module 716 may provide machine learning capabilities to a neural network as described herein.

As set forth above, certain compared metrics may have to exceed the acceptability threshold prior to the individual image data 110 being displayed on the display of the computing device 724. As a non-limiting example, the IOU of the individual image data 110 is used as a compared metric. In an embodiment, if the IOU of the individual image data 110 is equal to or above 0.4 (the acceptability threshold), the individual image data 110 will be displayed. Further, after the plurality of computer vision data 106 has been filtered based on the acceptability threshold, the filtered plurality of computer vision data 106 may be sorted from increasing to decreasing IOU. The machine learning module 716 may generate an overall acceptability score and parameters used by the machine learning module 716 may not be static predetermined parameters, but parameters that are machine learned and adjustable to be dynamic parameters based on the plurality of acceptability scores of a particular plurality of computer vision data 106. For instance, as more data is added to the database 714, from which the overall acceptability score is determined, the overall acceptability score may be adjusted to be more accurate in view of the updated data set and based on one or more parameters used to calculate the overall acceptability score.

The centralized hub 712, the assignment sub-module 712A, and the artificial intelligence module 716 are coupled to the communication path 702 and communicatively coupled to the processor 704. As will be described in further detail below, the processor 704 may process the input signals received from the system modules and/or extract information from such signals.

Data stored and manipulated in the system 700 as described herein is utilized by the machine learning module 716, which is able to leverage a cloud computing-based network configuration such as the cloud to apply Machine Learning and Artificial Intelligence. This machine learning application may create models that can be applied by the intelligent acceptability system 700, to make it more efficient and intelligent in execution. As an example and not a limitation, the machine learning module 716 may include artificial intelligence components selected from the group consisting of an artificial intelligence engine, Bayesian inference engine, and a decision-making engine, and may have an adaptive learning engine further comprising a deep neural network learning engine.

The system 700 comprises the network interface hardware 718 for communicatively coupling the system 700 with a computer network such as network 722. The network interface hardware 718 is coupled to the communication path 702 such that the communication path 702 communicatively couples the network interface hardware 718 to other modules of the system 700. The network interface hardware 718 can be any device capable of transmitting and/or receiving data via a wireless network. Accordingly, the network interface hardware 718 can comprise a communication transceiver for sending and/or receiving data according to any wireless communication standard. For example, the network interface hardware 718 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 7, data from various applications running on computing device 724 can be provided from the computing device 724 to the system 700 via the network interface hardware 718. The computing device 724 can be any device having hardware (e.g., chipsets, processors, memory, etc.) for communicatively coupling with the network interface hardware 718 and a network 722. Specifically, the computing device 724 can comprise an input device having an antenna for communicating over one or more of the wireless computer networks described above.

The network 722 can comprise any wired and/or wireless network such as, for example, wide area networks, metropolitan area networks, the internet, an intranet, satellite networks, or the like. Accordingly, the network 722 can be utilized as a wireless access point by the computing device 724 to access one or more servers (e.g., a server 720). The server 720 and any additional servers generally comprise processors, memory, and chipset for delivering resources via the network 722. Resources can include providing, for example, processing, storage, software, and information from the server 720 to the system 700 via the network 722. Additionally, it is noted that the server 720 and any additional servers can share resources with one another over the network 722 such as, for example, via the wired portion of the network, the wireless portion of the network, or combinations thereof.

In embodiments, the systems and methods as described herein assist to significantly reduce inefficiencies associated with the structuring of unstructured data by efficiently filtering and sorting a plurality of computer vision data. As a non-limiting example, such a plurality of computer vision data may be received from a computer vision model and evaluated for an overall acceptability score. The systems and methods provide a more efficient processing system to filter, organize, and sort the plurality of computer vision data to determine the acceptability at a speedier rate, which assist to reduce an amount of time spent by a machine or person analyzing the plurality of computer vision data. Data analytic insights, such as those associated with overall acceptability scores for different pluralities of computer vision data, are integrated. Further, machine learning techniques based on such data analytics, which may include a plurality of acceptability scores from the plurality of computer vision data, for instance, may be utilized to generate a more accurate acceptability score in light of the plurality of acceptability scores.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing:

Aspect 1. A system for centralized meta-data management across platforms comprises one or more processors, one or more memory components communicatively coupled to the one or more processors, and machine readable instructions stored in the one or more memory components. The machine readable instructions may cause the system to perform at least the following when executed by the one or more processors: store meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles; identify within the centralized hub at least one user as a manager of the at least one or more entitlements or roles of a first user of the plurality of users, the first user assigned as an owner of the at least one or more entitlements or roles; receive a request from the manager to transfer at least a selected portion of the at least one or more entitlements or roles of the first user assigned as the owner to one or more other users of the plurality of users; transfer the selected portion of the at least one or more entitlements or roles of the first user to the one or more other users; and assign the one or more other users as the one or more owners of the selected portion of the at least one or more entitlements or roles.

Aspect 2. The system of Aspect 1, wherein the request from the manager to transfer at least the selected portion of the at least one or more entitlements or roles of the first user is received based on a determination that the user account of the first user is deactivated from a group or an enterprise associated with the centralized hub.

Aspect 3. The system of Aspect 2, wherein upon the determination that the user account of the first user is deactivated, the manager is assigned as an owner of the at least one or more entitlements or roles of the first user.

Aspect 4. The system of any of Aspect 1 to Aspect 3, wherein the selected portion of the at least one or more entitlements or roles of the first user comprises all of the at least one or more entitlements or roles of the first user.

Aspect 5. The system of Aspect 4, further comprising machine readable instructions that cause the system to perform at least the following when executed by the one or more processors: transfer all of the at least one or more entitlements or roles of the first user to a primary user of the one or more other users, and assign the primary user as the owner of all of the at least one or more entitlements or roles.

Aspect 6. The system of any of Aspect 1 to Aspect 5, wherein the owner of the at least one or more entitlements or roles is assigned one or more rights to update meta-data associated with the at least one or more entitlements or roles.

Aspect 7. The system of any of Aspect 1 to Aspect 6, wherein the meta-data comprises software administrative meta-data for a respective platform of the at least two software platforms, the software administrative meta-data comprising descriptions of each entitlement, group, role, or combinations thereof, access rights, classifications, and software data of applications associated with an enterprise solution, wherein the access rights comprise assignment as owner, approver to provide access permissions for users, delegate, or combinations thereof for each user account associated with the respective platform.

Aspect 8. The system of any of Aspect 1 to Aspect 7, further comprising a graphical user interface, and machine readable instructions that cause the system to perform at least the following when executed by the one or more processors: display on the graphical user interface a subset of meta-data associated with the at least one or more entitlements or roles assigned to a user account of a user of the plurality of users; and display on the graphical user interface designation of the user account of the user as owner, delegate, or combinations thereof of the subset of meta-data associated with the at least one or more entitlements or roles.

Aspect 9. The system of Aspect 8, further comprising machine readable instructions that cause the system to perform at least the following when executed by the one or more processors: search via the graphical user interface access rights designations across the one or more entitlements and one or more roles of at least two software platforms in the centralized hub, wherein the access rights designations comprise owner, approver, delegate, group membership, assigned roles, assigned entitlements, applications associated with an enterprise solution, or combinations thereof.

Aspect 10. The system of any of Aspect 8 to Aspect 9, further comprising machine readable instructions that cause the system to perform at least the following when executed by the one or more processors: search via the graphical user interface owner transfer requests with respect to the one or more entitlements and one or more roles of at least two software platforms in the centralized hub.

Aspect 11. The system of any of Aspect 8 to Aspect 10, further comprising machine readable instructions that cause the system to perform at least the following when executed by the one or more processors: add or remove by the owner, via the graphical user interface, approver status for other users, delegates status for other users, or combinations thereof associated with the at least one or more entitlements or roles.

Aspect 12. The system of any of Aspect 8 to Aspect 11, further comprising machine readable instructions that cause the system to perform at least the following when executed by the one or more processors: display one or more icons on the graphical user interface representative of a state of a group, entitlement, or role of the at least one or more entitlements or roles, the state indicative of whether action is required to conform to a meta-data standard associated with the group, entitlement, or role.

Aspect 13. The system of any of Aspect 1 to Aspect 12, further comprising machine readable instructions that cause the system to perform at least the following when executed by the one or more processors: validate the request prior to transfer of the selection portion.

Aspect 14. The system of any of Aspect 1 to Aspect 13, further comprising machine readable instructions that cause the system to perform at least the following when executed by the one or more processors: detect whether a software for an enterprise solution associated with a related group, entitlement, or role of the at least one or more entitlements or roles is an inactive status; upon detection of the inactive status, prompt the owner to establish whether the related group, entitlement, or role are required; and upon a determination that the related group, entitlement, or role are not required, mark the software for the enterprise solution associated with the related group, entitlement, or role for deletion.

Aspect 15. A system for centralized meta-data management across platforms comprises a graphical user interface, one or more processors, one or more memory components communicatively coupled to the one or more processors, and machine readable instructions stored in the one or more memory components. The machine readable instructions may cause the system to perform at least the following when executed by the one or more processors: store meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles; identify within the centralized hub at least one user as a manager of the at least one or more entitlements or roles of a first user of the plurality of users, the first user assigned as an owner of the at least one or more entitlements or roles, wherein the owner of the at least one or more entitlements or roles is assigned one or more rights to update meta-data associated with the at least one or more entitlements or roles; display on the graphical user interface a subset of meta-data associated with the at least one or more entitlements or roles assigned to the first user of the plurality of users; receive a request from the manager to transfer at least a selected portion of the at least one or more entitlements or roles of the first user assigned as the owner to one or more other users of the plurality of users; transfer the selected portion of the at least one or more entitlements or roles of the first user to the one or more other users; and assign the one or more other users as the one or more owners of the selected portion of the at least one or more entitlements or roles.

Aspect 16. The system of Aspect 15, wherein the request from the manager to transfer at least the selected portion of the at least one or more entitlements or roles of the first user is received based on a determination that the user account of the first user is deactivated from a group or an enterprise associated with the centralized hub.

Aspect 17. A method of centralized meta-data management across platforms comprises storing meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles; identify within the centralized hub at least one user as a manager of the at least one or more entitlements or roles of a first user of the plurality of users, the first user assigned as an owner of the at least one or more entitlements or roles, wherein the owner of the at least one or more entitlements or roles is assigned one or more rights to update meta-data associated with the at least one or more entitlements or roles; display on the graphical user interface a subset of meta-data associated with the at least one or more entitlements or roles assigned to the first user of the plurality of users; receive a request from the manager to transfer at least a selected portion of the at least one or more entitlements or roles of the first user assigned as the owner to one or more other users of the plurality of users; transfer the selected portion of the at least one or more entitlements or roles of the first user to the one or more other users; assign the one or more other users as the one or more owners of the selected portion of the at least one or more entitlements or roles.

Aspect 18. The method of Aspect 17, wherein the selected portion of the at least one or more entitlements or roles of the first user comprises all of the at least one or more entitlements or roles of the first user, further comprising: transferring all of the at least one or more entitlements or roles of the first user to a primary user of the one or more other users; and assigning the primary user as the owner of all of the at least one or more entitlements or roles.

Aspect 19. The method of Aspect 17 to Aspect 18, wherein the owner of the at least one or more entitlements or roles is assigned one or more rights to update meta-data associated with the at least one or more entitlements or roles.

Aspect 20. The method of any of Aspect 17 to Aspect 19, wherein the meta-data comprises software administrative meta-data for a respective platform of the at least two software platforms, the software administrative meta-data comprising descriptions of each entitlement, group, role, or combinations thereof, access rights, classifications, and software data of applications associated with an enterprise solution, wherein the access rights comprise assignment as owner, approver to provide access permissions for users, delegate, or combinations thereof for each user account associated with the respective platform.

What is claimed is:

1. A system for centralized meta-data management across platforms, the system comprising:
    one or more processors;
    one or more memory components communicatively coupled to the one or more processors; and
    machine readable instructions stored in the one or more memory components that cause the system to perform at least the following when executed by the one or more processors:
        store meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles;
        identify within the centralized hub at least one user as a manager of the at least one or more entitlements or roles of a first user of the plurality of users, the first user assigned as an owner of the at least one or more entitlements or roles;
        receive a request from the manager to transfer at least a selected portion of the at least one or more entitlements or roles of the first user assigned as the owner to one or more other users of the plurality of users;
        transfer the selected portion of the at least one or more entitlements or roles of the first user to the one or more other users;
        assign the one or more other users as the one or more owners of the selected portion of the at least one or more entitlements or roles;
        detect whether a software for an enterprise solution associated with a related group, entitlement, or role of the at least one or more entitlements or roles is an inactive status;

upon detection of the inactive status, prompt the owner to establish whether the related group, entitlement, or role are required; and upon a determination that the related group, entitlement, or role are not required, mark the software for the enterprise solution associated with the related group, entitlement, or role for deletion.

2. The system of claim 1, wherein the request from the manager to transfer at least the selected portion of the at least one or more entitlements or roles of the first user is received based on a determination that the user account of the first user is deactivated from a group or an enterprise associated with the centralized hub.

3. The system of claim 2, wherein upon the determination that the user account of the first user is deactivated, the manager is assigned as an owner of the at least one or more entitlements or roles of the first user.

4. The system of claim 1, wherein the selected portion of the at least one or more entitlements or roles of the first user comprises all of the at least one or more entitlements or roles of the first user.

5. The system of claim 4, further comprising machine readable instructions that cause the system to perform at least the following when executed by the one or more processors:

transfer all of the at least one or more entitlements or roles of the first user to a primary user of the one or more other users; and assign the primary user as the owner of all of the at least one or more entitlements or roles.

6. The system of claim 1, wherein the owner of the at least one or more entitlements or roles is assigned one or more rights to update meta-data associated with the at least one or more entitlements or roles.

7. The system of claim 1, wherein the meta-data comprises software administrative meta-data for a respective platform of the at least two software platforms, the software administrative meta-data comprising descriptions of each entitlement, group, role, or combinations thereof, access rights, classifications, and software data of applications associated with an enterprise solution, wherein the access rights comprise assignment as owner, approver to provide access permissions for users, delegate, or combinations thereof for each user account associated with the respective platform.

8. The system of claim 1, further comprising a graphical user interface, and machine readable instructions that cause the system to perform at least the following when executed by the one or more processors:

display on the graphical user interface a subset of meta-data associated with the at least one or more entitlements or roles assigned to a user account of a user of the plurality of users; and display on the graphical user interface designation of the user account of the user as owner, delegate, or combinations thereof of the subset of meta-data associated with the at least one or more entitlements or roles.

9. The system of claim 8, further comprising machine readable instructions that cause the system to perform at least the following when executed by the one or more processors:

search via the graphical user interface access rights designations across the one or more entitlements and one or more roles of at least two software platforms in the centralized hub, wherein the access rights designations comprise owner, approver, delegate, group membership, assigned roles, assigned entitlements, applications associated with an enterprise solution, or combinations thereof.

10. The system of claim 8, further comprising machine readable instructions that cause the system to perform at least the following when executed by the one or more processors:

search via the graphical user interface owner transfer requests with respect to the one or more entitlements and one or more roles of at least two software platforms in the centralized hub.

11. The system of claim 8, further comprising machine readable instructions that cause the system to perform at least the following when executed by the one or more processors:

add or remove by the owner, via the graphical user interface, approver status for other users, delegates status for other users, or combinations thereof associated with the at least one or more entitlements or roles.

12. The system of claim 8, further comprising machine readable instructions that cause the system to perform at least the following when executed by the one or more processors:

display one or more icons on the graphical user interface representative of a state of a group, entitlement, or role of the at least one or more entitlements or roles, the state indicative of whether action is required to conform to a meta-data standard associated with the group, entitlement, or role.

13. The system of claim 1, further comprising machine readable instructions that cause the system to perform at least the following when executed by the one or more processors:

validate the request prior to transfer of the selection portion.

14. A system for centralized meta-data management across platforms, the system comprising:

a graphical user interface;

one or more processors;

one or more memory components communicatively coupled to the one or more processors; and machine readable instructions stored in the one or more memory components that cause the system to perform at least the following when executed by the one or more processors:

store meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles;

identify within the centralized hub at least one user as a manager of the at least one or more entitlements or roles of a first user of the plurality of users, the first user assigned as an owner of the at least one or more entitlements or roles, wherein the owner of the at least one or more entitlements or roles is assigned one or more rights to update meta-data associated with the at least one or more entitlements or roles;

display on the graphical user interface a subset of meta-data associated with the at least one or more entitlements or roles assigned to the first user of the plurality of users;

receive a request from the manager to transfer at least a selected portion of the at least one or more entitlements or roles of the first user assigned as the owner to one or more other users of the plurality of users;

transfer the selected portion of the at least one or more entitlements or roles of the first user to the one or more other users;

assign the one or more other users as the one or more owners of the selected portion of the at least one or more entitlements or roles;

detect whether a software for an enterprise solution associated with a related group, entitlement, or role of the at least one or more entitlements or roles is an inactive status;

upon detection of the inactive status, prompt the owner to establish whether the related group, entitlement, or role are required; and upon a determination that the related group, entitlement, or role are not required, mark the software for the enterprise solution associated with the related group, entitlement, or role for deletion.

15. The system of claim 14, wherein the request from the manager to transfer at least the selected portion of the at least one or more entitlements or roles of the first user is received based on a determination that the user account of the first user is deactivated from a group or an enterprise associated with the centralized hub.

16. A method of centralized meta-data management across platforms, the method comprising:

storing meta-data associated with one or more entitlements and one or more roles of at least two software platforms in a centralized hub, wherein each role comprises at least one of the one or more entitlements, each user of a plurality of users of the centralized hub is assigned a user account, and the user account is assigned to at least one or more entitlements or roles of the one or more entitlements and the one or more roles;

identifying within the centralized hub at least one user as a manager of the at least one or more entitlements or roles of a first user of the plurality of users, the first user assigned as an owner of the at least one or more entitlements or roles;

receiving a request from the manager to transfer at least a selected portion of the at least one or more entitlements or roles of the first user assigned as the owner to one or more other users of the plurality of users;

transferring the selected portion of the at least one or more entitlements or roles of the first user to the one or more other users;

assigning the one or more other users as the one or more owners of the selected portion of the at least one or more entitlements or roles;

detecting whether a software for an enterprise solution associated with a related group, entitlement, or role of the at least one or more entitlements or roles is an inactive status;

upon detection of the inactive status, prompting the owner to establish whether the related group, entitlement, or role are required; and upon a determination that the related group, entitlement, or role are not required, marking the software for the enterprise solution associated with the related group, entitlement, or role for deletion.

17. The method of claim 16, wherein the selected portion of the at least one or more entitlements or roles of the first user comprises all of the at least one or more entitlements or roles of the first user, further comprising:

transferring all of the at least one or more entitlements or roles of the first user to a primary user of the one or more other users; and assigning the primary user as the owner of all of the at least one or more entitlements or roles.

18. The method of claim 16, wherein the owner of the at least one or more entitlements or roles is assigned one or more rights to update meta-data associated with the at least one or more entitlements or roles.

19. The method of claim 16, wherein the meta-data comprises software administrative meta-data for a respective platform of the at least two software platforms, the software administrative meta-data comprising descriptions of each entitlement, group, role, or combinations thereof, access rights, classifications, and software data of applications associated with an enterprise solution, wherein the access rights comprise assignment as owner, approver to provide access permissions for users, delegate, or combinations thereof for each user account associated with the respective platform.

* * * * *